(12) United States Patent
Muraki et al.

(10) Patent No.: US 7,995,104 B2
(45) Date of Patent: Aug. 9, 2011

(54) IMAGE PICK-UP APPARATUS, IMAGE DATA PROCESSING APPARATUS, AND RECORDING MEDIUM

(75) Inventors: Jun Muraki, Hamura (JP); Koki Dobashi, Musashino (JP); Kimiyasu Mizuno, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 340 days.

(21) Appl. No.: 12/369,887

(22) Filed: Feb. 12, 2009

(65) Prior Publication Data

US 2009/0207278 A1  Aug. 20, 2009

(30) Foreign Application Priority Data

Feb. 15, 2008 (JP) ................................. 2008-035270

(51) Int. Cl.
  *H04N 5/225* (2006.01)
(52) U.S. Cl. ................................... 348/220.1
(58) Field of Classification Search ............... 348/220.1, 348/221.1
  See application file for complete search history.

(56) References Cited

U.S. PATENT DOCUMENTS

| 6,204,881 | B1 | 3/2001 | Ikeda et al. |
| 2002/0118293 | A1 | 8/2002 | Hori et al. |
| 2005/0057678 | A1 | 3/2005 | Fujii |
| 2005/0083414 | A1* | 4/2005 | Hidaka et al. ............ 348/220.1 |
| 2007/0279498 | A1* | 12/2007 | Nonaka ................... 348/220.1 |

FOREIGN PATENT DOCUMENTS

| JP | 2004-064467 A | 2/2004 |
| JP | 2005-260662 A | 9/2005 |
| JP | 2007-60449 A | 3/2007 |
| JP | 2007-251611 A | 9/2007 |
| JP | 2007-259156 A | 10/2007 |

OTHER PUBLICATIONS

Japanese Office Action dated Jan. 12, 2010 and English translation thereof issued in a counterpart Japanese Application No. 2008-035270.

* cited by examiner

*Primary Examiner* — David L Ometz
*Assistant Examiner* — Dillon Durnford-Geszvain
(74) *Attorney, Agent, or Firm* — Holtz, Holtz, Goodman & Chick, PC

(57) ABSTRACT

In a moving image recording process, a shooting operation using a short exposure time appropriate for shooting a still image, and a shooting operation using a long exposure time appropriate for shooting a moving image are performed repeatedly in turn. Plural pieces of frame image data "B" shot by the shooting operations using a long exposure time are successively recorded as moving image data. When a shutter button is pressed in the moving image recording process, frame image data which is shot using a short exposure time just before the shutter button is pressed is recorded as a still image.

13 Claims, 8 Drawing Sheets

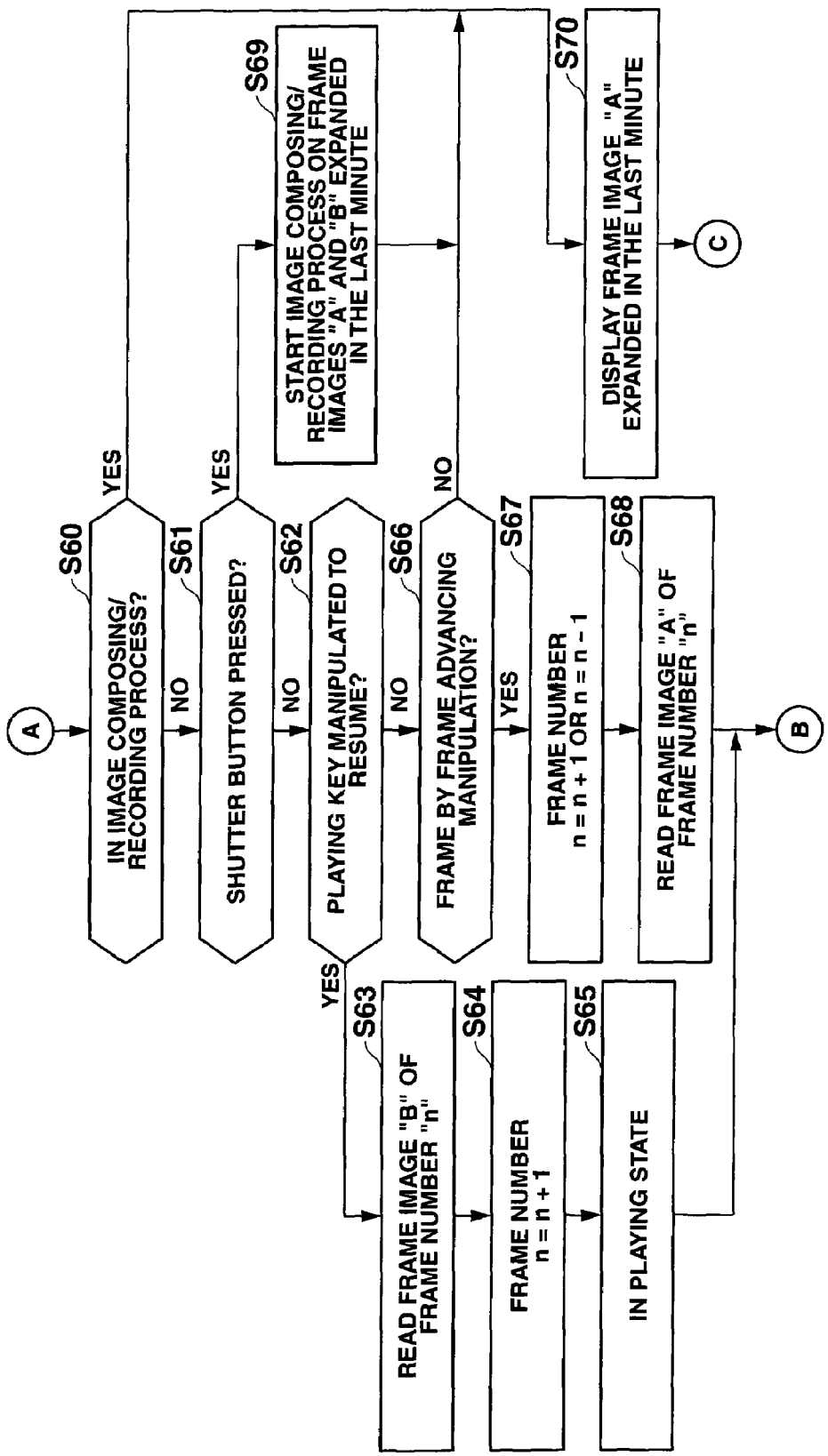

IMAGE PICK-UP APPARATUS, IMAGE DATA PROCESSING APPARATUS, AND RECORDING MEDIUM

BACKGROUND OF THE INVENTION

1. Field of the Invention

The present invention relates to an image pick-up apparatus with a function of playing a moving image.

2. Description of the Related Art

Digital cameras are used, which have a function of shooting a still image during a moving image shooting operation. But in these digital cameras, the moving image shooting operation is suspended while a still image shooting operation is performed. A technique for solving the above disadvantage is proposed. The technique is to use still image data as moving image data missing during the still image shooting operation, which still image data is obtained by the still image shooting operation performed during the moving image shooting operation.

But since the still image data is shot under a shooting condition different from, the moving image shooting operation, the above technique cannot obtain a smooth moving image in continuity.

SUMMARY OF THE INVENTION

The present invention has an object to provide an apparatus that is capable of shooting a still image during a moving image shooting operation as well as of obtaining a moving image in continuity even in a still image shooting operation.

According to one aspect of the invention, there is provided an image pick-up apparatus which comprises an image pick-up unit; a first shooting control unit for controlling the image pick-up unit to shoot under a first exposure condition appropriate for shooting a moving image repeatedly; a second shooting control unit for controlling the image pick-up unit to shoot under a second exposure condition appropriate for shooting a still image repeatedly for a period except the period of the first shooting control unit controls the image pick-up unit to shoot; a moving image obtaining unit for obtaining the image data shot by the first shooting control unit as moving image data; and a still image obtaining unit for obtaining the image data shot by the second shooting control unit as still image data.

According to another aspect of the invention, there is provided an image data processing apparatus for processing moving image data, each of moving image frames included in the moving image being associated with still image data shot under an exposure condition appropriate for shooting a still image, the apparatus comprising: a designating unit for designating an arbitrary moving image frame included in the moving image data; a still image obtaining unit for obtaining a still image data corresponding to the moving image frame designated by the designating unit; and a recording unit for associating the still image data obtained by the still image obtaining unit with the moving image frame designated by the designating unit, and for recording the still image data associated with the moving image frame.

According to other aspect of the invention, there is provided a computer readable recording medium to be mounted on an image pick-up apparatus having an image pick-up unit and a built-in computer, the computer readable recording medium having a computer program when executed by the built-in computer to implement a function comprising: a first shooting control function of controlling the image pick-up unit to shoot under an first exposure condition appropriate for shooting a moving image repeatedly; a second shooting control function of controlling the image pick-up unit to shoot under a second exposure condition appropriate for shooting a still image repeatedly for a period except the period of the first shooting control unit controls the image pick-up unit to shoot; a moving image obtaining function of obtaining the image data shot by the first shooting control unit as moving image data; and; and a still image obtaining function of obtaining the image data shot by the second shooting control unit as still image data.

According to still other aspect of the invention, there is provided a computer readable recording medium to be mounted on an image data processing apparatus having a recording unit and a built-in computer, the image data processing apparatus for processing moving image data, each of moving image frames of the moving image data being associated with still image data shot under an exposure condition appropriate for shooting a still image, the computer readable recording medium having a computer program when executed by the built-in computer to implement a function comprising: a designating function of designating an arbitrary moving image frame of the moving image data; a still image obtaining function of obtaining a still image data corresponding to the moving image frame designated by the designating function; and a recording function of associating the still image data obtained by the still image obtaining function with the moving image frame designated by the designating function, and recording the still image data associated with the moving image frame in the recording unit.

BRIEF DESCRIPTION OF THE DRAWINGS

FIG. 8 is a flow chart of the moving image playing operation of the digital camera according to the third embodiment of the invention.

PREFERRED EMBODIMENTS OF THE INVENTION

Now, embodiments of an image pick-up apparatus of the invention, which is adopted in a digital camera will be described in detail with reference to the accompanying drawings.

First Embodiment

A. Configuration of Digital Camera

Figure 1:
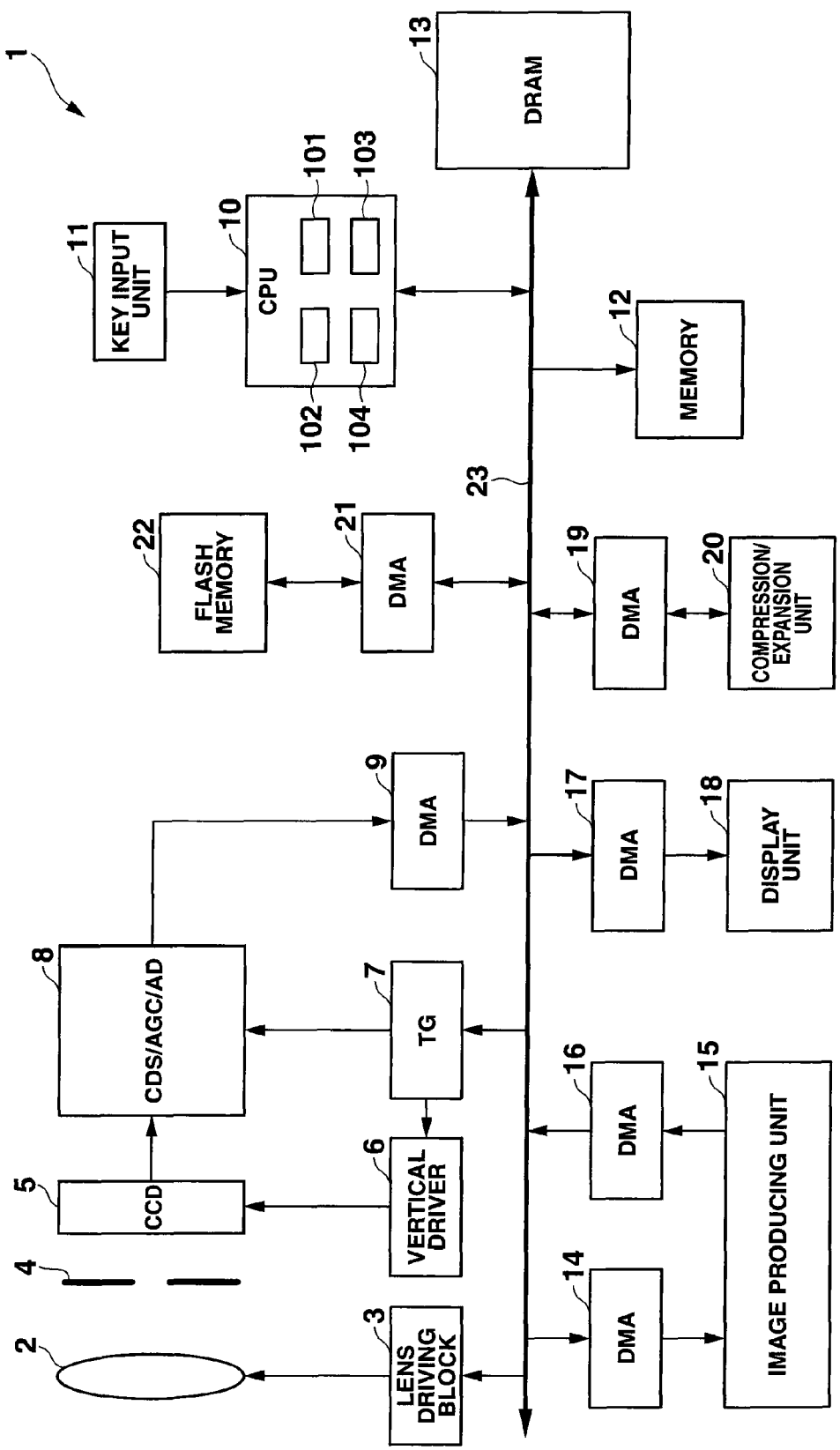
FIG. 1 is a block diagram of a digital camera according to embodiments of the present invention.

FIG. 1 is a block diagram of a circuit configuration of a digital camera 1 according to the embodiments of present invention.

The digital camera 1 comprises an image pick-up lens 2, lens driving block 3, aperture stop 4, CCD 5, vertical driver 6, TG (Timing Generator) 7, unit circuit 8, DMA controller (hereinafter, simply "DMA") 9, CPU 10, key input, unit 11, memory 12, DRAM 13, DMA 14, image producing unit 15, DMA 16, DMA 17, display unit 18, DMA 19, compression/expansion unit 20, DMA 21, flash memory 22 and bus 23.

The image pick-up lens 2 includes a focus lens and zoom lens, each including plural lenses. The image pick-up lens 2 is connected with the lens driving block 3. The lens driving block 3 comprises a focus motor (not shown) for moving the focus lens along its optical axis, and a zoom motor (not shown) for moving the zoom lens along its optical axis, and further comprises a focus motor driver (not shown) and zoom motor driver (not shown), wherein the focus motor driver and zoom motor driver drive the focus motor and zoom motor in accordance with control signals sent from CPU 10, respectively.

The aperture stop 4 has a driving circuit. The driving circuit operates the aperture stop 4 in accordance with a control signal sent from CPU 10.

The aperture stop 4 serves to adjust an amount of incident light onto CCD 5. Exposure (the amount of light received by CCD 5) is adjusted by setting an aperture and shutter speed.

CCD 5 is scanned by the vertical driver 6, whereby light intensities of R, G, B color values of an object are photoelectrically converted into an image pick-up signal every certain period. The image pick-up signal is supplied to the unit circuit 8. An operation of the vertical driver 6 and operation of the unit circuit 8 are controlled by CPU 10 in accordance with a timing signal of TG 7. Further, CCD 5 has a function of an electronic shutter. The electronic shutter is controlled by the vertical driver 6 depending on the timing signal sent from TG 7. The exposure time varies depending on a shutter speed of the electronic shutter.

The unit circuit 8 is connected with TG 7, and comprises CDS circuit (Correlated Double Sampling circuit), AGC circuit and A/D converter, wherein CDS circuit performs a correlated double sampling process on the image pick-up signal output from CCD5, and AGC circuit controls a gain of the sampled signal, and then A/D converter converts the gain controlled analog signal into a digital signal. Passing through the unit circuit 8, the image pick-up signal obtained by CCD 5 is sent through DMA 9 to the buffer memory (DRAM 13) to be recorded therein as Bayer pattern image data (hereinafter, "Bayer data").

CPU 10 is an one chip micro-computer having a function of compressing the image data recorded in the buffer memory 13 and recording the compressed image data in the flash memory 14 and a function of displaying the image data recorded in the buffer memory 13. The one chip micro-computer controls a whole operation of the digital camera 1. Further, CPU 10 comprises a clock circuit for counting the time.

In particular, CPU 10 has a sequential shooting control unit 101, composition/record processing unit 102, playing control unit 103, and a recording control unit 104. The sequential shooting control unit 101 controls an image pick-up element to shoot using a first exposure time appropriate for shooting a moving image repeatedly, and to shoot using a second exposure time appropriate for shooting a still image repeatedly for a period except the period of the shooting using the first exposure time. The composition/record processing unit 102 composes and records frame image data. The playing control unit 103 controls the frame image data playing, and the recording control unit 104 controls recording of the obtained frame image data onto the flash memory 22.

The key input unit 11 comprises plural manipulation keys including a shutter button for instructing to shoot a still image, a recording button for instructing to start and/or terminate a moving image shooting operation, a shooting mode key, playing mode key, play key, playing stop key, temporarily stop key, cross key, SET key, etc. When manipulated by a user, the key input unit 11 outputs an appropriate manipulation signal to CPU 10.

In the memory 12 are stored necessary data and a control program necessary for CPU 10 to control each part of the digital camera 1. CPU 10 works in accordance with the control program.

DRAM 13 is used as a buffer memory for temporarily storing the image data obtained by CCD 5, and also used as a work memory of CPU 10.

DMA 14 serves to read the image data (Bayer data) from the buffer memory and to output the read image data to the image producing unit 15.

The image producing unit 15 performs a pixel correction process, gamma correction process, and white balance process on the image data sent from DMA 14, and further generates luminance and color difference signals (YUV data). In short, the image producing unit 15 is a circuit block for performing an image processing.

DMA 16 serves to store in the buffer memory the image data (YUV data) of the luminance and color difference signals which have been subjected to the image processing in the image producing unit 15.

DMA 17 serves to read and output the image data (YUV data) stored in the buffer memory to the display unit 18.

The display unit 18 has a color LCD and a driving circuit and displays an image of the image data (YUV data).

DMA 19 serves to output the image data (YUV data) and image data compressed and stored in the buffer memory to the compression/expansion unit 20, and to store in the buffer memory the image data compressed and/or the image data expanded by the compression/expansion unit 20.

The compression/expansion unit 20 serves to compress and/or expand image data, for example, in JPEG format and/or MPEG format.

DMA 21 serves to read the compressed image data stored in the buffer memory and to store the read image data in the flash memory 22, and further serves to read the compressed image data recorded in the flash memory 22 and to store the read compressed image data in the buffer memory.

B. Operation of Digital Camera

A moving image shooting operation of the digital camera 1 according to the first embodiment of the present invention will be described. The digital camera 1 has two exposure modes (first and second exposure modes). The first mode is an exposure mode "B" in which CCD 5 is exposed to light for an exposure time "B" appropriate for shooting a moving image, and the second one is an exposure mode "A" in which CCD 5 is exposed to light for an exposure time "A" appropriate for shooting a still image, wherein the exposure time "A" is shorter than the exposure time "B". The exposure mode is switched every shooting operation. In other words, shoot the next in exposure mode B when shot it in exposure mode A. Then, shoot the next in exposure mode A when shot it in exposure mode B, again.

CCD 5 is capable of shooting an object at least at a frame period of 300 fps. CCD 5 is exposed to light for the exposure time "A" in the exposure mode "A", wherein the exposure time "A" (for example, $1/1200$ sec.) is shorter than one frame period, and is exposed to light for the exposure time "B" (for example, 1/75 sec.) in the exposure mode "B", wherein the exposure time B is equivalent to four frame periods. In the present embodiment, one frame period is set to 1/300 sec.

Figure 2:
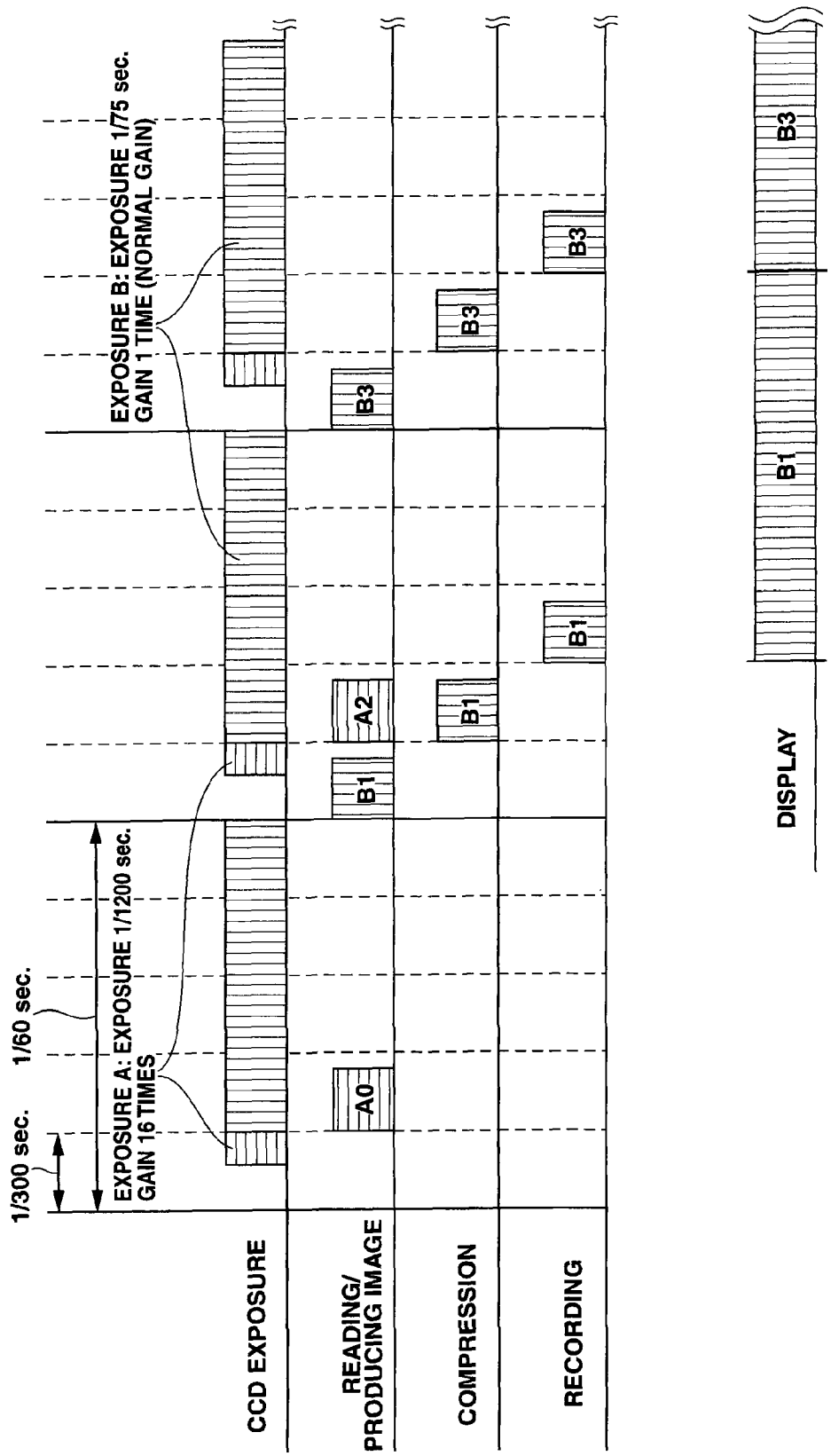
FIG. 2 is a timing chart of a moving image shooting operation.

FIG. 2 is a time chart of the moving image shooting operation.

As shown in FIG. 2, the shooting operation in the exposure mode "A" and the shooting in the exposure mode "B" are performed repeatedly in turn, and only frame image data "B" is compressed and recorded. In short, frame image data "A" is produced. But frame image data "A" is not compressed and recorded unless the shutter button is pressed.

An operation of reading image data from CCD 5 and an operation of generating luminance and color difference signals by the image producing unit 15 are performed within a period of less than one frame period (less than 1/300 sec.) In short, a series of operations are performed within a period of less than one frame period (less than 1/300 sec.), in which Bayer data is read from CCD 5 and stored in the buffer memory through the unit circuit 8, and further converted into image data of the luminance and color difference signals by the image producing unit 15. To keep a balance in luminance level between frame image data obtained in the exposure mode "B" and frame image data obtained in the exposure mode "A", an aperture, sensitivity (for example, a gain value), and ND (Neutral Density) filter are adjusted. It is presumed in the present embodiment that only the gain value is adjusted to take the balance in the luminance level between the frame image data obtained in the exposure mode "B" and the frame image data obtained in the exposure mode "A" and that the gain value is set to a normal gain value for shooting operation in the exposure mode "B" and the gain value is set to 16 times of the normal gain value for shooting operation in the exposure mode "A", whereby the luminance level of the frame image data obtained in the exposure mode "B" and the luminance level of the frame image data obtained in the exposure mode "A" are equalized.

Compression of the image data of the luminance and color difference signals and recording the compressed image data are performed within a period of less than one frame period. In short, a series of operations are performed within a period of less than one frame period, wherein the series of operations include operation of the compression/expansion unit 20 to compress the image data of the luminance and color difference signals stored in the buffer memory and to store the compressed image data in the buffer memory, and operation of reading the compressed image data from the buffer memory and storing the read data in the flash memory 22.

Hereinafter, the frame image data which is obtained in the exposure mode "A" is referred to as "frame image data "A" and the frame image data which is obtained in the exposure mode "B" is referred to as "frame image data "B". The frame image data is displayed with the number (frame number) attached to, wherein the number indicates how many pieces of frame image data were shot before the displayed frame image data is obtained. The number is counted up from the number of "0".

For instance, the frame image data A0 in FIG. 2 is frame image data shot for the 0-th time and obtained in the exposure mode "A". The frame image data B1 is frame image data shot for the first time and obtained in the exposure mode "B".

In the present embodiment, a shooting operation in the exposure mode "A" is performed at first, and then the exposure mode "A" is switched to the exposure mode "B", and the shooting operation in the exposure mode "B" is performed. Therefore, the frame image data shot in the exposure mode "A" is expressed in frame image data $A(2n)$, and the frame image data shot in the exposure mode "B" is expressed in frame image data $B(2n+1)$, where "n"=0, 1, 2, 3, . . . . The term "n" is referred to as a frame number.

Figure 3:
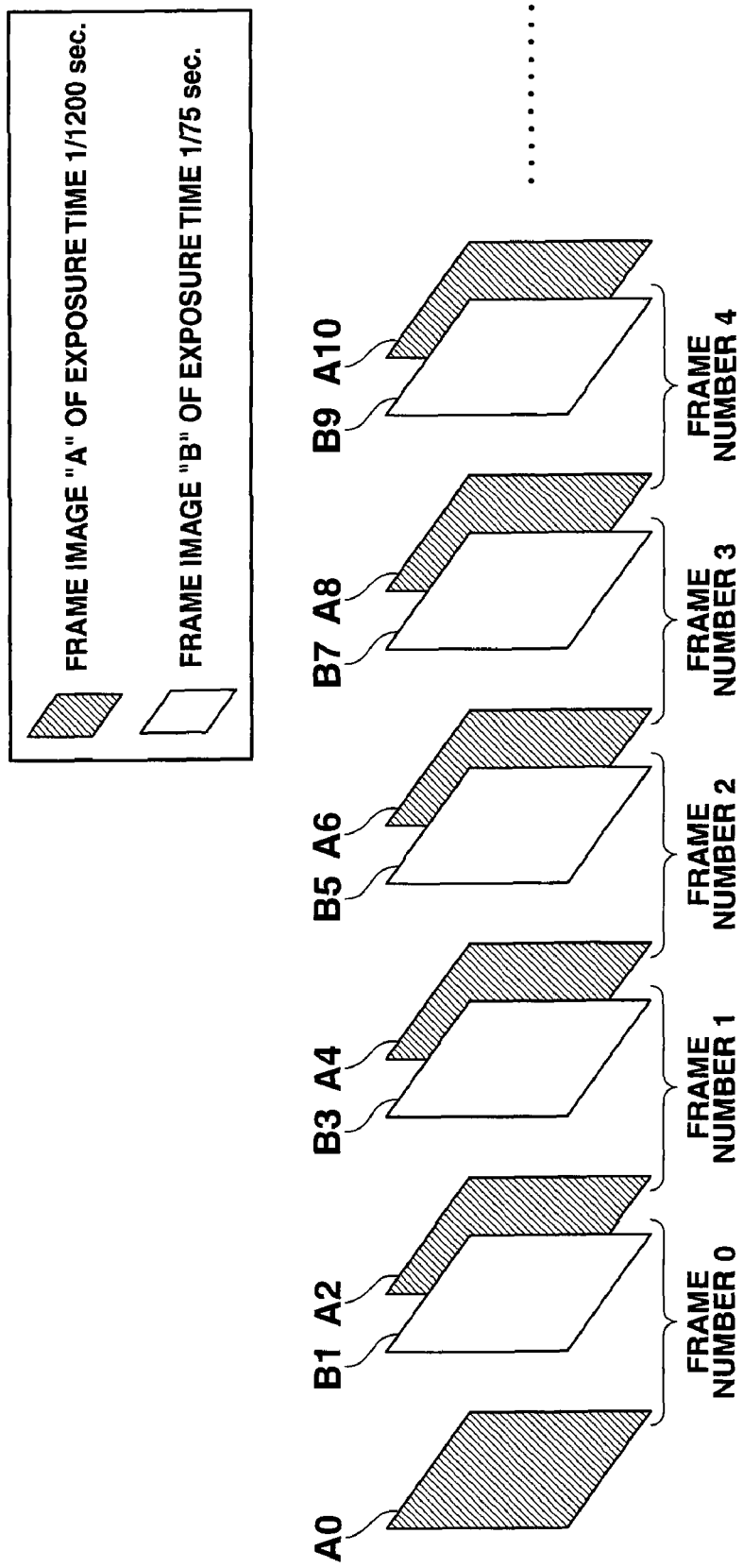
FIG. 3 is a view illustrating plural pieces of shot frame image data and frame numbers "n" of the plural pieces of frame image data.

FIG. 3 is a view illustrating plural pieces of frame image data shot alternately in the exposure mode "A" and in the exposure mode "B", and bearing the frame number "n".

As shown in FIG. 3, the frame image data "A" and frame image data "B" are shot or obtained alternately in the exposure mode "A" and in the exposure mode "B", and the number "n" attached to the frame image data indicates the shooting order at which such frame image data is shot.

The frame image data "A0" and the frame image data "B1" have the common frame number "n=0". The frame image data "A2" and the frame image data "B3" have the common frame number "n=1". The frame image data "A4" and the frame image data "B5" have the common frame number "n=2". The frame number "n" indicates the shooting order of the frame image data shot or obtained using the exposure time "A" or the exposure time "B". For instance, the frame number "n" of the frame image data "B1" is "0", and therefore the frame image data "B1" is data shot or obtained using an exposure time of 1/75 sec. for the 0-th time, and the frame number "n" of the frame image data "A8" is "4", and therefore the frame image data "A8" is data shot or obtained using an exposure time of 1/1200 sec. for the fourth time.

The shooting operation is performed alternately in the exposure mode "A" and in the exposure mode "B", and the exposure time is less than one frame period in the exposure mode "A" and is equivalent to four frame periods in the exposure mode "B". Therefore, both the shooting period of frame image data "A" in the exposure mode "A" and the shooting period of frame image data "B" in the exposure mode "B" will be 1/60 sec.

In a real time view (live view) of frame image data, only plural pieces of frame image data "B" shot or obtained in the exposure mode "B" are successively displayed in real time. FIG. 2 is a view showing that the plural pieces of frame image data "B" are successively displayed. The real time view (live view) means that plural pieces of obtained frame image data are successively displayed.

Figure 4:
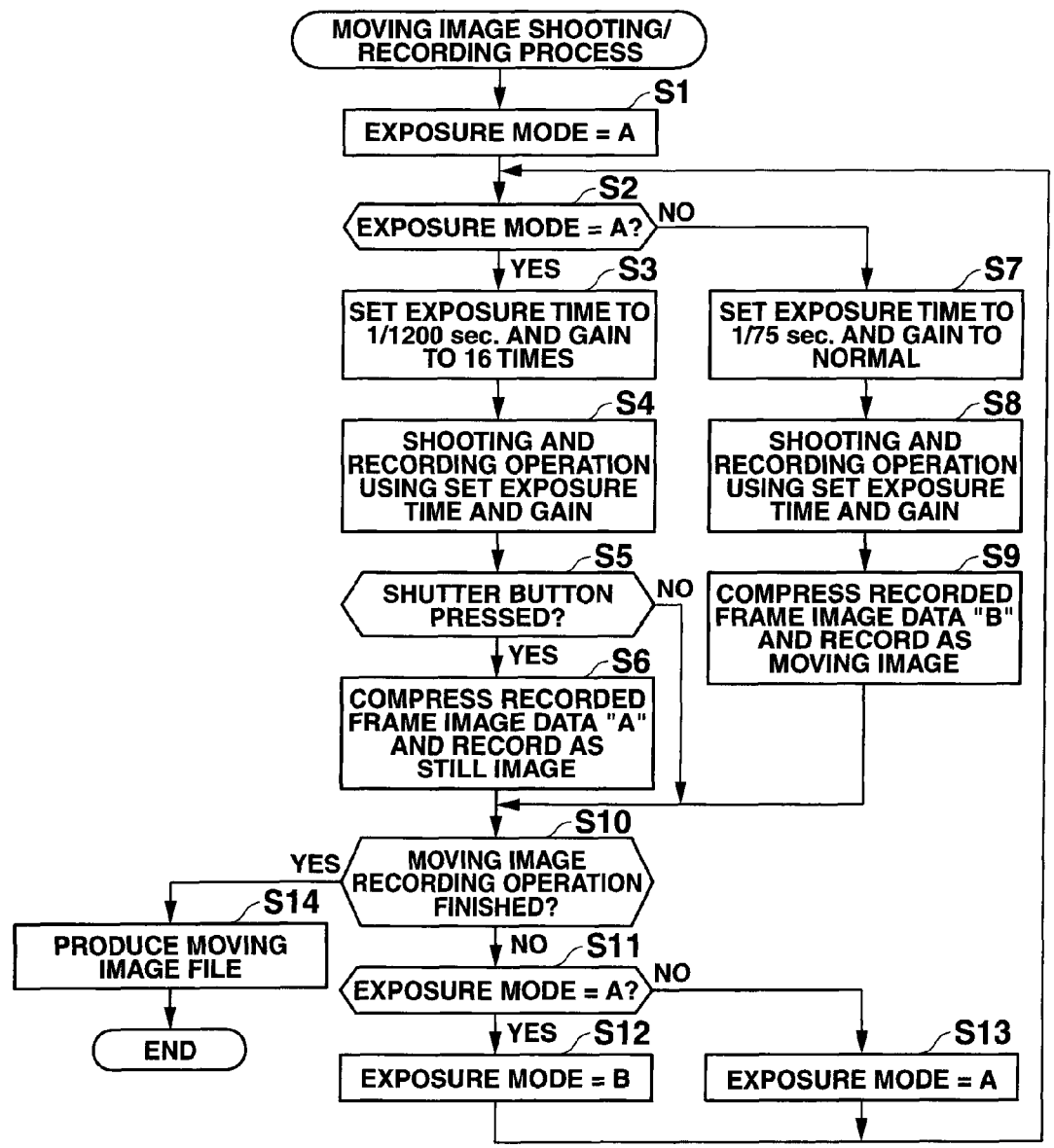
FIG. 4 is a flow chart of a moving image recording operation of the digital camera according to the first embodiment of the invention.

The operation of the digital camera 1 according to the first embodiment of the invention will be described in accordance with the flow chart of FIG. 4.

A shooting mode is set upon operation of the shooting mode key in the key input unit 11. When the recording button of the key input unit 11 has been pressed by the user in the shooting mode, that is, when a manipulation signal has been sent from the key input unit 11 to CPU 10 in response to the user's pressing operation of the recording button, CPU 10 determines that the moving image recording process has started and sets the exposure mode "A" at step S1. Data in an exposure mode recording area of the buffer memory is updated when the exposure mode "A" is set at step S1. In short, a term of "A" is stored in the exposure mode recording area of the buffer memory in place of data previously stored therein at step S1.

The sequential shooting control unit 101 of CPU 10 judges at step S2 whether or not the exposure mode "A" has been set currently. The judgment is made based on the data stored in the exposure mode recording area of the buffer memory.

When it is determined at step S2 that the exposure mode "A" has been set (YES at step S2), the sequential shooting control unit 101 of CPU 10 sets the exposure time to 1/1200 sec. and the gain value to 16 times of the normal gain value, respectively at step S3. The normal gain value is a gain value set when the shooting in the exposure mode "B" operation is performed. Since the exposure time has been set to 1/1200 sec. in the exposure mode "A" and the exposure time has been set to 1/75 sec. in the exposure mode "B", the exposure time in the exposure mode "A" will be 1/16 of the exposure time in the exposure mode "B". Therefore, when the gain value in the exposure mode "A" is set to 16 times of the normal gain value, the frame image data "A" shot in the exposure mode "A" and the frame image data "B" shot in the exposure mode "B" are balanced in the luminance level.

The sequential shooting control unit 101 of CPU 10 performs the shooting operation using the exposure time (1/1200 sec.) and the gain value (16 times) set at step S3. In other words, image data accumulated on CCD 5 during the set exposure time (1/1200 sec.) is read, and a gain of the read image data is automatically adjusted based on the set gain value by AGC of the unit circuit 8, and then image data of the luminance and color difference signals is generated from the gain adjusted image data by the image producing unit 15. The generated image data is stored in the buffer memory at step S4.

CPU 10 judges at step S5 whether or not the shutter button has been pressed. The judgment is made based on whether or not a manipulation signal has been sent to CPU 10 from the key input unit 11.

When it is determined at step S5 that the shutter button has been pressed (YES at step S5), the recording control unit 104 of CPU 10 makes the compression/expansion unit 20 compress the frame image data "A" which was shot most recently at step S4 and store the compressed frame image data "A" (a still image in JPEG format) in the flash memory 22 at step S6. Then, CPU 10 stores the compressed frame image data "A" as a still image file and advances to step S10.

When it is determined at step S5 that the shutter button has not been pressed (NO at step S5), CPU advances directly to step S10.

Meanwhile, when it is determined at step S2 that the exposure mode "A" has not been set (NO at step S2), that is, when it is determined that the exposure mode "B" has been set, the sequential shooting control unit 101 of CPU 10 sets the exposure time to 1/75 sec. and the gain value to the normal gain value (unitary gain value) at step S7.

Then, the sequential shooting control unit 101 of CPU 10 performs the shooting operation using the exposure time (1/75 sec.) and the normal gain value (unitary gain value) set at step S7. In other words, image data accumulated on CCD 5 during the set exposure time (1/75 sec.) is read, and a gain of the read image data is automatically adjusted based on the set gain value by AGC of the unit circuit 8, and then image data of the luminance and color difference signals is generated from the gain adjusted image data by the image producing unit 15. The generated image data is stored in the buffer memory at step S8.

The recording control unit 104 of CPU 10 makes the compression/expansion unit 20 compress the frame image data "B" which is shot and stored most recently at step S8 and store the compressed frame image data (a moving image in MPEG format or M-JPEG format) in the flash memory 22 at step S9, and advances to step S10.

At step S10, CPU 10 judges whether or not the moving image recording operation should be finished. The judgment is made based on whether or not a recording capacity left in the flash memory 22 is shorter than a predetermined amount, or whether or not a manipulation signal has been sent to CPU 10 from the key input unit 11 in response to the user's operation of the recording button.

When it is determined at step S10 that the moving image recording operation should be not finished (NO at step S10), CPU 10 judges at step) S11 whether or not the exposure mode "A" has been set currently.

When it is determined at step S11 that the exposure mode "A" has been, set currently (YES at step S11), CPU 10 sets the exposure mode "B" at step S12, and returns to step S2.

Meanwhile, when it is determined at step S11 that the exposure mode "A" has not been set currently (NO at step S11), CPU 10 sets the exposure mode "A" at step S13, and returns to step S2.

The information stored in the exposure mode recording area of the buffer is updated when the exposure mode "B" has been set at step S12 or when the exposure mode "A" has been set at step S13.

During the operation described above, the frame image data "A" shot using the exposure time 1/1200 sec. and the frame image data "B" shot using the exposure time 1/75 sec. are alternately obtained as shown in FIG. 3, and only plural pieces of frame image data "B" are successively recorded as a moving image. When the shutter button is pressed during the moving image recording operation, the frame image data "A" shot most recently is recorded as a still image.

Meanwhile, it is determined at step S10 that the moving image recording operation should be finished (YES at step S10), the recording control unit 104 of CPU 10 creates a moving image file using the frame image data "B" recorded as a moving image at step S14.

During the moving image recording operation, the frame image data is successively displayed in real time, but in the first embodiment, only the frame image data "B" shall be displayed in real time, whereby a smooth moving image can be displayed in real time and a continuous moving image can be displayed with suppressed deterioration in image quality.

As described above, in the digital camera 1 according to the first embodiment of the invention the shooting operation using a short exposure time and the shooting operation using a long exposure time are performed repeatedly in turn. The frame image data "B" shot using a long exposure time is recorded as a moving image and the frame image data "A" shot using a short exposure time is recorded as a still image, whereby smooth continuity is maintained in the moving image and deterioration in image quality is suppressed in the still image and the moving image.

The plural pieces of frame image data make up the moving image to be recorded, and the frame image data is shot using a long exposure time every certain interval. Therefore, continuity of the moving image is not encumbered and a smooth moving image of a high quality is obtained. Since the frame image data to be recorded as a still image is shot using a short exposure time, a still image of a high image quality is obtained.

Second Embodiment

A digital camera according to the second embodiment, of the invention will be described.

In the digital camera according to the first embodiment of the invention, the frame image data "A" is recorded simply as a still image, but in the second embodiment, records the image data which composed the frame image data "A" and the frame image data "B" as a still image.

C. Operation of Digital Camera

The image pick-up apparatus of the present invention is also put into practice in the digital camera according to the second embodiment. The digital camera has substantially the same circuit configuration of the digital camera 1 of the first embodiment shown in FIG. 1.

Operation of the digital camera according to the second embodiment of the invention will be described with reference to a flow chart shown in FIG. 5.

The shooting mode is set upon operation of the shooting mode key in the key input unit 11.

When the recording button of the key input unit 11 is pressed by the user in the shooting mode, that is, when a manipulation signal is sent from the key input unit 11 to CPU 10 in response to the user's pressing operation of the recording button, CPU 10 determines that the moving image recording process has started and sets the exposure mode "A" at step S21. Data in the exposure mode recording area of the buffer memory is updated at step S21, when the exposure mode "A" has been set. In short, a term of "A" is stored in the exposure mode recording a reel of the buffer memory in place of the data previously stored therein at step S21.

The sequential shooting control unit 101 of CPU 10 judges at step S22 whether or not the exposure mode "A" has been set currently. The judgment is made based on data stored in the exposure mode recording area of the buffer memory.

When it is determined at step S22 that the exposure mode "A" has been set (YES at step S22), the sequential shooting control unit 101 of CPU 10 sets the exposure time to 1/1200 sec. and the gain value to 16 times of the normal gain value, respectively at step S23. The normal gain value is a gain value (a unitary gain value) set when the shooting operation is performed in the exposure mode "B". Since the exposure time has been set to 1/1200 sec. in the exposure mode "A" and the exposure time has been set to 1/75 sec. in the exposure mode "B", the exposure time in the exposure mode "A" will be 1/16 of the exposure time in the exposure mode "B". Therefore, when the gain value in the exposure mode "A" is set to 16 times of the normal gain value, the frame image data "A" shot in the exposure mode "A" and the frame image data "B" shot in the exposure mode "B" are balanced in the luminance level.

The sequential shooting control unit 101 of CPU 10 performs the shooting operation using the exposure time (1/1200 sec.) and the gain value (16 times) set at step S23. In other words, image data accumulated on CCD 5 during the set exposures time (1/1200 sec.) is read, and a gain of the read image data is automatically adjusted based on the set gain value by AGC of the unit circuit 8, and then image data of the luminance and color difference signals is generated from the gain adjusted image data by the image producing unit 15. The generated image data is stored in the buffer memory at step S24.

CPU 10 judges at step S25 whether or not the composition/record processing unit 102 is performing an image composing/recording process for composing the frame image data. The image composing/recording process will be described in detail later.

When it is determined at step S25 that the composition/record processing unit 102 is not performing the image composing/recording process (NO at step S25), CPU 10 judges at step S26 whether or not the shutter button has been pressed. The judgment is made based on whether or not a manipulation signal has been set to CPU 10 from the key input unit 11 in response to the user's operation of the shutter button.

When it is determined at step S26 that the shutter button has been pressed (YES at step S26), the composition/record processing unit 102 starts the image composing/recording process using the frame image data "A" shot and recorded most, recently at step S24 and frame image data "B" shot most recently to be recorded at step S29, thereby producing composed image data and recording the composed image data at step S27, and then advances to step S31.

Meanwhile, it is determined at step S25 that the composition/record processing unit 102 is performing the image composing/recording process (YES at step S25), CPU 10 advances directly to step S31.

Meanwhile, when it is determined at step S22 that the exposure mode "A" has not been set (NO at step S22), that is, when it is determined that the exposure mode "B" has been set, the sequential shooting control unit 101 of CPU 10 sets the exposure time to 1/75 sec. and the gain value to the normal gain value (unitary gain value) at step S28.

Then, the sequential shooting control unit 101 of CPU 10 performs the shooting operation using the exposure time (1/75 sec.) and the normal gain value (unitary gain value) set at step S28. In other words, image data accumulated on CCD 5 during the set exposure time (1/75 sec.) is read, and a gain of the read image data is automatically adjusted based on the set gain value by AGC of the unit circuit 8, and then image data of the luminance and color difference signals is generated from the gain adjusted image data by the image producing unit 15. The generated image data is stored in the buffer memory at step S29.

The recording control unit 104 of CPU 10 makes the compression/expansion unit 20 compress the frame image data "B" shot and stored most recently at step S29 and store the compressed frame image data (a moving image in MPEG format or M-JPEG format) in the flash memory 22 at step S30, and advances to step S31.

At step S31, CPU 10 judges whether or not the moving image recording process should be finished. The judgment is made based on whether or not a recording capacity left in the flash memory 22 is shorter than a predetermined amount, or whether or not a manipulation signal has been sent to CPU 10 from the key input unit 11 in response to the user's operation of the recording button.

When it is determined at step S31 that the moving image recording process should be not finished (NO at step S31), CPU 10 judges at step S32 whether or not the exposure mode "A" has been set currently.

When it is determined at step S32 that the exposure mode "A" has been set currently (YES at step S32), CPU 10 sets the exposure mode "B" at step S33, and returns to step S22.

Meanwhile, when it is determined at step S32 that the exposure mode "A" has not been set currently (NO at step S32), that is, when it is determined that the exposure mode "B" has been set currently, CPU 10 sets the exposure mode "A" at step S34, and returns to step S22.

During the operation described above, the frame image data "A" shot using the exposure time 1/1200 sec. and the frame image data "B" shot using the exposure time 1/75 sec. are alternately obtained as shown in FIG. 3, and only plural pieces of frame image data "B" are successively recorded as a moving image. When the shutter button is pressed during the moving image recording operation, the composing process is performs on the frame image data "A" and frame image data "B" shot most recently. The composed image data is recorded as a still image at step S49 in FIG. 6.

Meanwhile, it is determined at step S31 that the moving image recording operation should be finished (YES at step S31), the recording control unit 104 of CPU 10 creates a moving image file using the frame image data "B" recorded as a moving image at step S35.

During the moving image recording operation, the shot frame image data is successively displayed in real time, but in the second embodiment, only the frame image data "B" shot using the exposure time "B" shall be displayed in real time, whereby a smooth moving image can be displayed in real time and a continuous moving image can be displayed with suppressed deterioration in image quality.

Image Composing/Recording Process

The image composing/recording process will be described with reference to a flow chart shown in FIG. 6.

Figure 5:
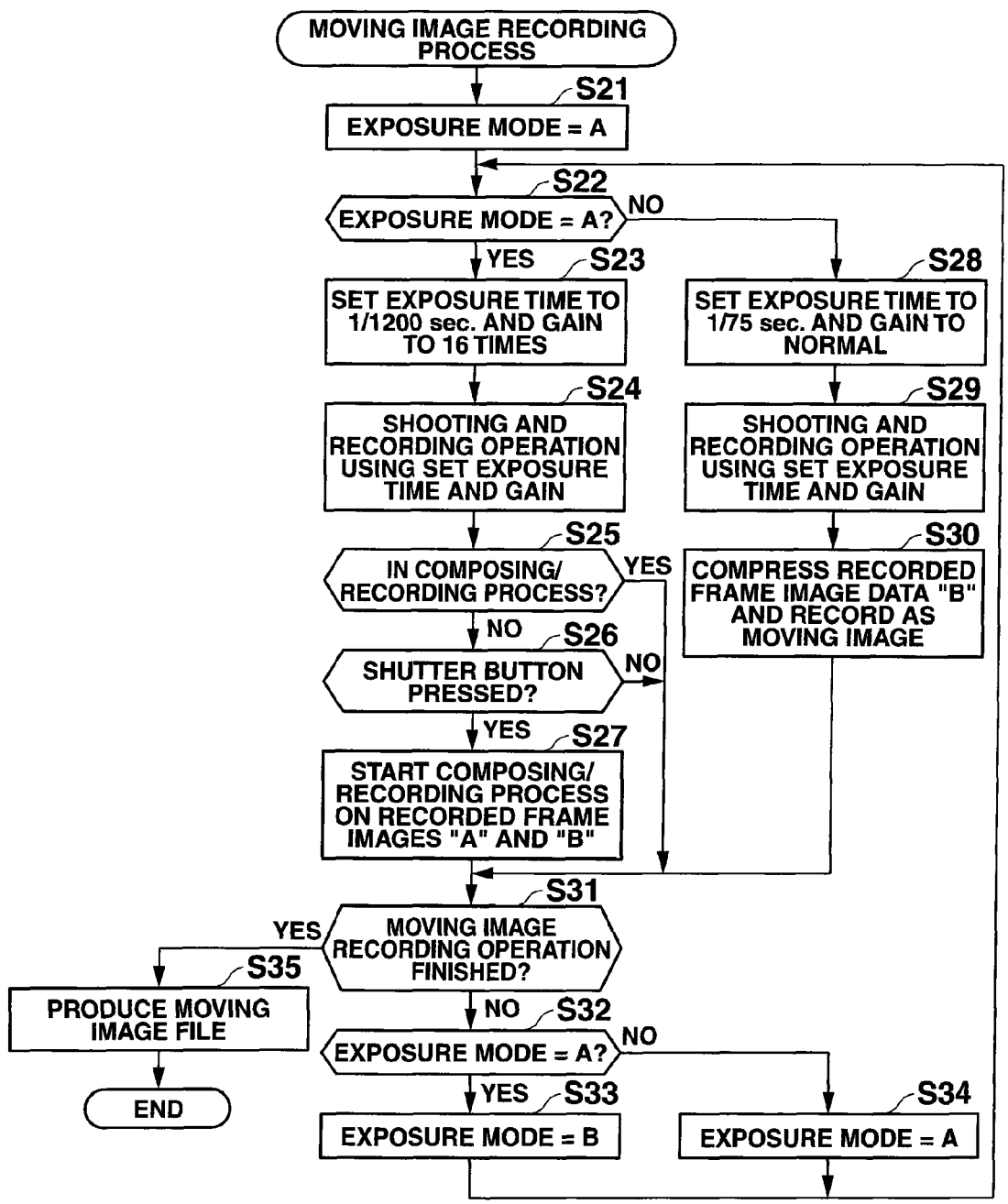
FIG. 5 is a flow chart of a moving image recording operation of the digital camera according to the second embodiment of the invention.
Figure 6:
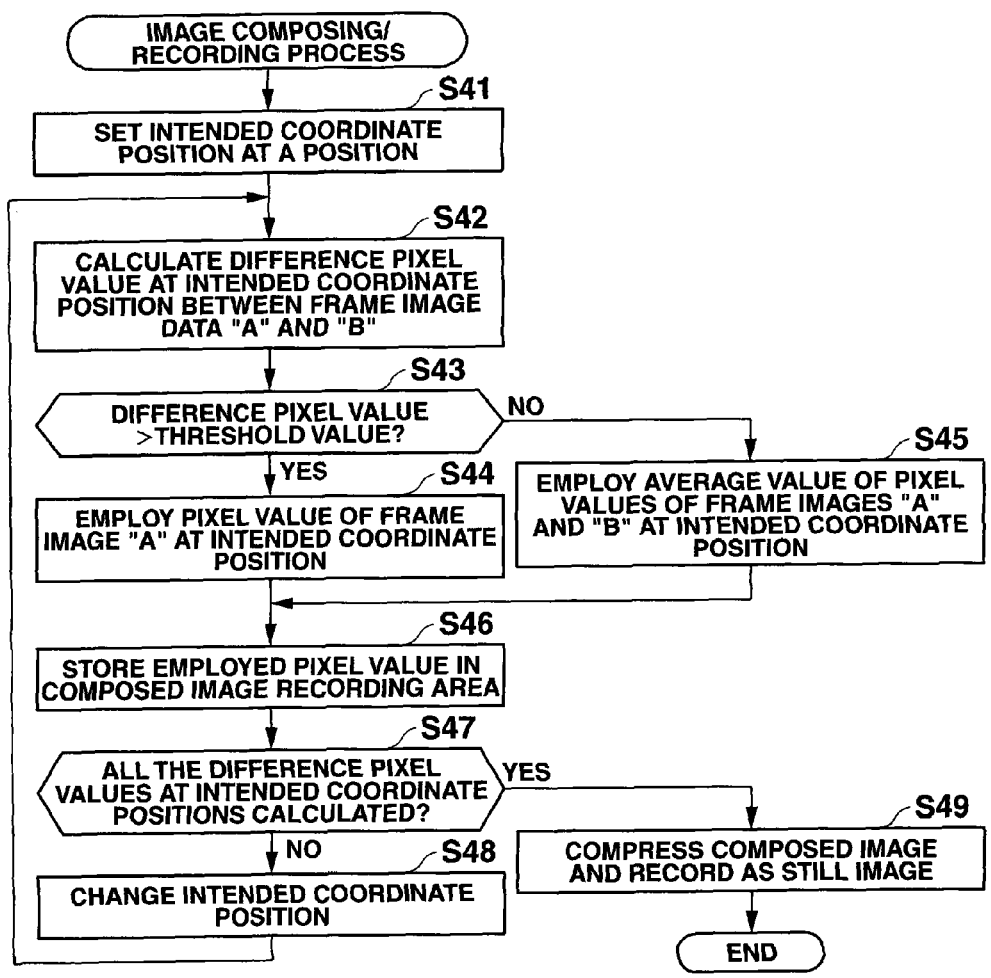
FIG. 6 is a flow chart of an image composing/recording operation.

When the image composing/recording process has started at step S27 in FIG. 5, the composition/record processing unit 102 of CPU 10 sets an intended coordinate position at a certain position at step S41 in FIG. 6. The composition/record processing unit 102 of CPU 10 calculates a difference value (pixel difference value) between an pixel value at the set intended coordinate position of the frame image data "A" shot and recorded most recently at step S24 in FIG. 5 and an pixel value at the set intended coordinate position of the frame image data "B" shot and recorded most recently at step S29 in FIG. 5 (step S42 in FIG. 6). The pixel difference value is expressed in an absolute value.

Then the composition/record processing unit 102 of CPU 10 nudges at step S43 whether or not the calculated pixel difference value is larger than a threshold value.

When it is determined at step S43 that the calculated pixel difference value is larger than the threshold value (YES at step S43), the composition/record processing unit 102 of CPU 10 adopts the pixel value at the set intended coordinate position of the frame image data "A" as a pixel value at the set intended coordinate position of the composed image data at step S44 and advances to step S46.

When it is determined at step S43 that the calculated pixel difference value is not larger than the threshold value (NO at step S43), the composition/record processing unit 102 of CPU 10 adopts an average value as a pixel value at the set intended coordinate position of the composed image data at step S45 and advances to step S46, wherein the average value is the mean of the pixel value at the set intended coordinate position of the frame image data "A" and the pixel value at the set intended coordinate position of the frame image data "B".

The composition/record processing unit 102 of CPU 10 stores the adopted pixel value as a pixel value at a currently set intended coordinate position of the composition image data in a composition image recording area of the buffer memory (step S46).

Then the composition/record processing unit 102 of CPU 10 judges at step S47 whether or not pixel difference values at all the intended coordinate positions have been calculated, that is, whether or not all the intended coordinate positions have been set.

When it is determined at step S47 that the pixel difference values at all the intended coordinate positions have not been calculated (NO at step S47), the composition/record processing unit 102 of CPU 10 changes setting of the intended, coordinate positions at step S48, and returns to step S42. That is, the composition/record processing unit 102 of CPU 10 sets the intended coordinate position to a coordinate position where a pixel difference value has not been calculated, whereby all the pixel values of the composed image data are determined.

Meanwhile, when it is determined at step S47 that the pixel difference values at all the intended coordinate positions have been calculated (YES at step S47), the composition/record processing unit 102 of CPU 10 makes the compression/expansion unit 20 compress as still image (JPEG format) the composed image data stored in the composed image recording area of the buffer memory and record the compressed composed image data in the flash memory 22 at step S49. Now, the image composing/recording process is finished.

As described above, in the digital camera according to the second embodiment, of the invention, the shooting operation using a short exposure time and the shooting operation using a long exposure time are performed repeatedly in turn. Since the frame image data "B" shot using a long exposure time is recorded as a moving image, a smooth continuity is maintained in the moving image and deterioration in image quality is suppressed in the moving image.

The frame image data recorded as a still image is image data which composed the frame image data "A" shot using a short exposure time and the frame image data "B" shot using a long exposure time, and therefore S/N ratio of the image data recorded as a still image is enhanced and image quality in the still image is also enhanced. In short, in the case where the frame image data obtained using a short exposure time is simply recorded as a still image, the frame image data has a trend toward the worse S/N ratio due to the short exposure time, but the disadvantage is avoided by composition the frame image data "A" and frame image data "B".

Third Embodiment

A digital camera according to the third embodiment of the invention will be described. In the digital camera according to the first embodiment of the invention, the frame image data "A" is recorded as a still image during the moving image recording operation, but in the digital camera according to the third embodiment of the invention, the frame image data "A" is recorded as a still image during the moving image playing operation.

D. Operation of Digital Camera

The image pick-up apparatus of the present invention is also put into practice in the digital camera according to the second embodiment. The digital camera has substantially the same circuit configuration shown in FIG. 1.

In the digital camera according to the third embodiment of the invention, it is assumed that the frame image data "A" shot using a short exposure time and the frame image data "B" shot using a long exposure time are recorded as a single moving image file and the recorded moving image file is played. In the digital camera according to the first embodiment of the invention, only plural pieces of frame image data "B" shot sequentially are recorded, but in the digital camera according to the third embodiment of the invention, it is assumed that plural pieces of frame image data "A" shot sequentially and plural pieces of frame image data "B" shot sequentially are associated with each other and recorded and only the plural pieces of frame image data "B" are played.

Now, operation of the digital camera according to the third embodiment will be described with reference to a flow chart of FIG. 7.

A playing mode is set upon the user's operation of a playing mode switching key and a moving image file of the intention to play is selected from among the moving image files recorded in the flash memory 22 upon the user's operation of the cross key and SET key of the key input unit 11. The playing control unit 103 of CPU 10 brings the digital camera into a playing state at step S51, and sets the frame number of the intention to play to the number "0" (the frame number=0) at step S52.

The playing control unit 103 of CPU 10 performs a standby process at step S53 until the display timing is reached. An interval of the display timing is determined depending on a display frame rate. In the present embodiment, since the display frame rate is set to 60 fps, the display timing comes every 1/60 sec.

The playing control unit 103 of CPU 10 judges at step S54 whether or not the digital camera is in the playing operation.

When it is determined at step S54 that the digital camera is in the playing operation (YES at step 354), the playing control unit 103 of CPU 10 judges at step S55 whether or not a pause manipulation has been performed by the user. The judgment is made depending on whether or not a manipulation signal corresponding to the pause key manipulation has been sent to CPU 10 from the key input unit 11.

When it is determined at step S55 that the pause manipulation has not been performed (NO at step S55), the playing control unit 103 of CPU 10 reads from the flash memory 22 the compressed frame image data "B" corresponding to the frame number set currently and stores the read compressed frame image data in buffer memory (step S56). For example, in the case where the frame number "n" is set to "2" currently, the frame image data "B5" is read from the flash memory 22.

Then, the playing control unit 103 of CPU 10 increments the frame number "n" to "n=n+1" at step S57. For instance, in the case where the frame number "n" is set to "2", the frame number is incremented to "3".

The playing control unit 103 of CPU 10 makes the compression/expansion unit 20 expand the frame image data "B" read most recently at step S71 and display the expanded frame image data "B" on the display unit 18 at step S72. For example, in the case where the frame number "n" is set to "2", the frame image data "B5" is displayed on the display unit 18. Then, the playing control unit 103 of CPU 10 judges at step S73 whether or not the playing operation should be finished. When it is judged at step S73 that the playing operation should not be finished (NO at step S73), CPU 10 returns to step S53.

When the frame image data having the last frame number "n" among the moving image file of the intention to play is displayed or when an instruction to finish the playing operation is given in response to the user's manipulation of the key input unit 11, it is determined that the playing operation is to be finished.

Meanwhile, when it is determined at step S55 that the pause manipulation has been performed (YES at step S55), the playing control unit 103 of CPU 10 reads from the flash memory 22 the compressed frame image data "A" corresponding to the fame number "n" set currently in the moving image file of the intention to play, and stores the data "A" in the buffer memory at step S58. For instance, in the case where the frame number "n" is set to "2", the frame image data "A4" is read from the flash memory 22.

The playing control unit 103 of CPU 10 brings the digital camera into the pause state at step S59. The playing control unit 103 of CPU 10 makes the compression/expansion unit 20 expand the frame image data "A" read most recently at step S71, and display the expanded frame image data "A" on the display unit 18 at step S72. When it is judged at step S73 that the playing operation should not be finished (NO at step S73), CPU 10 returns to step S53.

Meanwhile, when it is determined at step S54 that the digital camera is not in the playing operation, that is, the digital camera stays in the pause state (NO at step S54), CPU 10 advances to step S60 in FIG. 8, where the playing control unit 103 of CPU 10 judges whether or not the composition/record processing unit 102 is performing the image composing/recording process on the frame image data. When it is determined at step S60 that the image composing/recording process is not performed (NO at step S60), the playing control unit 103 of CPU 10 judges at step S61 whether or not the user has pressed the shutter button. The judgment is made depending on whether or not a manipulation signal has been sent to CPU 10 from the key input unit 11 in response to the shutter button manipulation by the user.

When it is determined at step S61 that the user has not pressed the shutter button (NO at step S61), the playing control unit 103 of CPU 10 judges at step S62 whether or not the user has manipulated a playing key to resume the playing operation. The judgment is made depending on whether or not a manipulation signal has been sent to CPU 10 from the key input unit 11 in response to the user's manipulation of the playing key.

When it is determined at step S62 that the playing operation has been resumed (YES at step S62), the playing control unit 103 of CPU 10 reads from the flash memory 22 the compressed frame image data "B" corresponding to the fame number "n" set currently in the moving image file of the intention to play, and stores the read frame image data "B" in the buffer memory at step S63.

Then, CPU 10 sets the frame number "n" to "n=n+1" at step S64, thereby bringing the digital camera into the playing state at step S65.

Figure 7:
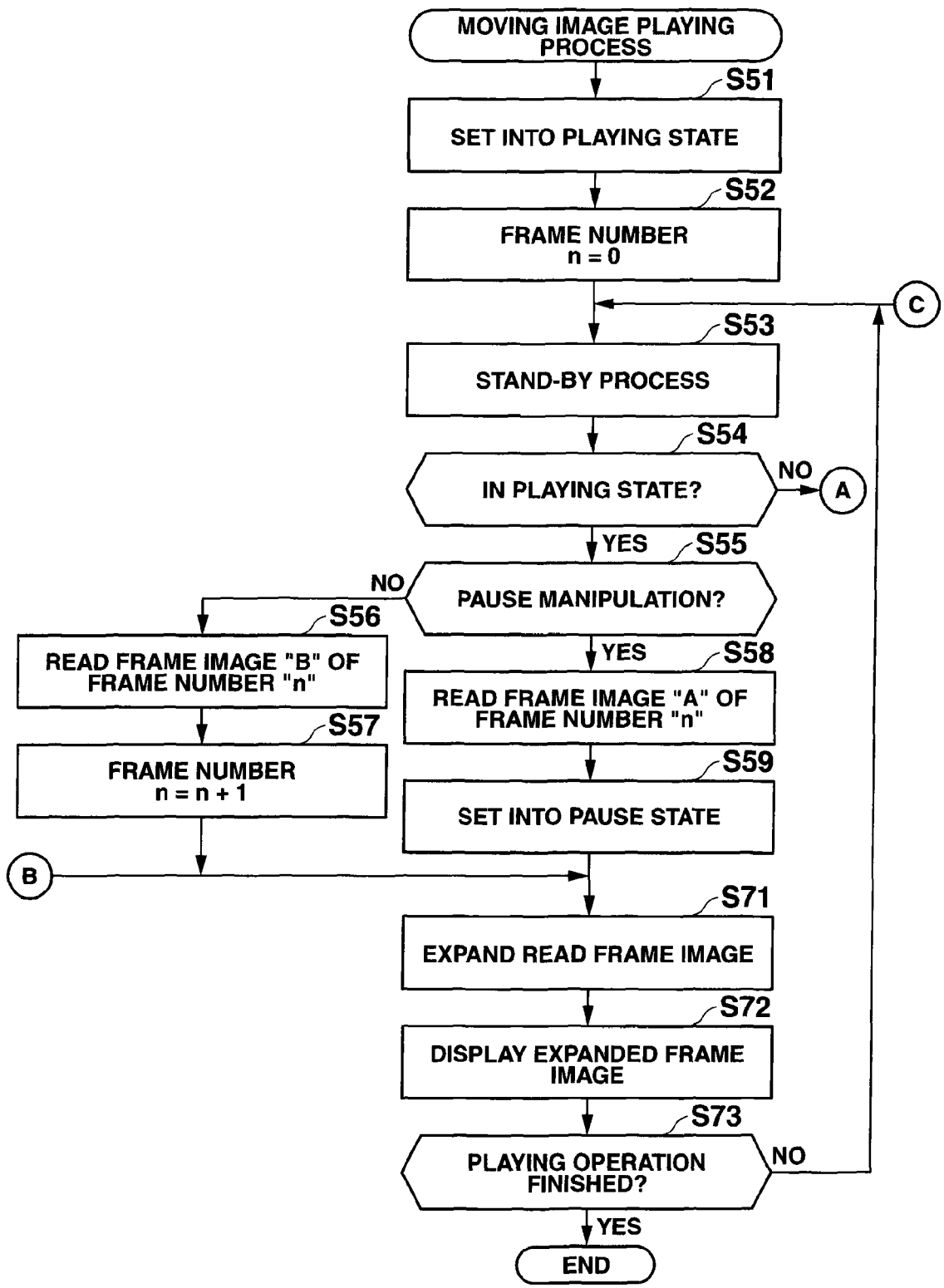
FIG. 7 is a flow chart of a moving image playing operation of the digital camera according to the third embodiment of the invention.

The playing control unit 103 of CPU 10 makes the compression/expansion unit 20 expand the frame image data "B" read most recently at step S71 in FIG. 7, thereby displaying the expanded, frame image data. "B" on the display unit 18 at step S72. When it is judged at step S73 that the playing operation should not be finished (NO at step S73), CPU 10 returns to step S53.

Meanwhile, it is determined at step S62 that the digital camera is not in the playing operation (MO at step S62), the playing control unit 103 of CPU 10 judges at step S66 whether or not a frame by frame advancing manipulation has been performed. The judgment is made depending on whether or not a manipulation signal has been sent to CPU 10 from the key input unit 11 in response to the user's manipulation of "->" key or "<-" key of the cross key.

When it is determined at step S66 that the frame by frame advancing manipulation has been performed (YES at step S66), the playing control unit 103 of CPU 10 sets the frame number "n" to "n=n+1" or "n=n-1" in response to the frame by frame advancing manipulation at step S67. When the "->" key of the cross key is manipulated, the frame number "n" is set to "n=n+1", and when "<-" key of the cross key is manipulated, the frame number "n" is set to "n=n-1".

Then, the playing control unit 103 of CPU 10 reads from, the flash memory 22 the compressed frame image data "A" corresponding to the fame number "n" set currently in the moving image file of the intention to play, and stores the read frame image data "A" in the buffer memory at step S68.

The playing control unit 103 of CPU 10 makes the compression/expansion unit 20 expand the frame image data "A" read most recently at step S71 in FIG. 7, thereby displaying the expanded frame image data "A" on the display unit 18 at step S72. And when it is determined at step S73 that the playing operation should not be finished (NO at step S73), CPU 10 returns to step S53.

Meanwhile, it is determined at step S61 that the shutter button has been pressed (YES at step S61), the composition/record processing unit 102 starts the image composing/recording process using the frame image data "A" expanded most recently (frame image data "A" previously displayed), or the frame image data "A" having the currently set frame number "n" and the frame image data "B" shot just before said frame image data "A" at step S69, and advances to step S70.

In the image composing/recording process in the third embodiment, the composing process of the second embodiment is performed on the frame image data "A" and frame image data "B" shot most recently and the composed image data is recorded.

In the composing process, the frame image data "B" having the frame number which is less by "1" than the currently set frame number "n" is read and expanded, whereby the frame image data "A" having the currently set frame umber "n" and the frame image data "B" having the frame number which is less by "1" than the currently set frame number "n" are composed.

Meanwhile, when it is determined at step S60 that the image composing/recording process is performed (YES at step S60), or when it is determined at step S66 that the frame by frame advancing manipulation is not performed (NO at step) S66), CPU 10 advances to step S70, where the playing control unit 103 of CPU 10 displays the frame image data "A" expanded most recently (frame image data "A" displayed most recently) on the display unit 18 and returns to step) S53. In other words, the frame image data "A" displayed most recently is continuously displayed on the display unit 18 as a still image.

As described above, in the playing process, the plural pieces of frame image data "B" are successively played in order of increasing frame number "n" during the playing operation, in other words, the frame image data "B1", frame image data "B3" and the frame image data "B5" are successively read and displayed, and when the pause manipulation is performed, the frame image data "A" is displayed, that has the frame number which is larger by "1" than the frame image data "B" displayed most recently. For example, in the case where the frame image data "B5" is displayed most recently, the frame image data "A6" is continuously displayed, chat has the frame number "3" which is larger by "1" than the frame image data "B5".

When the scrolling forward or back manipulation is performed in the pause state, the frame image delta "A" having the next frame number "n" or having the previous frame number "n" is displayed in response to the scrolling forward or back manipulation.

When the shutter button is pressed in the pause state, the frame image data "A" which is currently displayed and the frame image data "B" which was shot just before or after said frame image data "A" are composed, and it is recorded as a still image.

When the playing operation is resumed in the pause state, plural pieces of frame image data "B" are successively displayed, starting from the frame image data "B" halving the same frame number as the frame image data "A" which has been continuously displayed. For example, when the playing operation is resumed while the frame image data "A6" is being displayed, plural pieces of frame image data "B" are successively displayed, starting from the frame image data "B" having the same frame number "B7" as the frame image data "A6".

In the third embodiment described above, the shooting operation using a long exposure time and shooting operation using a short exposure time are performed repeatedly in turn, and image data obtained or shot in the shooting operations is recorded as a single moving image file and the frame image data "B" obtained using a long exposure time is displayed during the moving image playing operation. Meanwhile, the frame image data "A" obtained using a short exposure time is displayed in the pause state. Therefore, a beautiful moving image of an object moving smoothly can be played in the moving image playing operation, and a clear and sharp image can be displayed as a still image in the pause state. Continuity is maintained in the moving image and deterioration in image quality is suppressed in the moving image.

When the shutter button is pressed in the pause state, the frame image data "A" which is currently displayed and the frame image data "B" which was shot just before said frame image data "A" are composed, and it is recorded as a still image. Therefore S/N ratio of the image data recorded as a still image is enhanced and image quality in the still image is also enhanced.

MODIFICATIONS TO EMBODIMENTS OF THE INVENTION

Modifications may be made to the above embodiments as follows:

(01) In the above embodiments, the shooting operation using a short exposure time and the shooting operation using a long exposure time are performed repeatedly in turn. But in place of the above shooting operations, the shooting method may be adopted, in which the shooting operations which are continuously performed using a short exposure time once or plural times and the shooting operations which are continuously performed using a long exposure time once or plural times are performed repeatedly in turn.

In other words, the shooting method is repeatedly performed, in which the shooting operation using an exposure time is performed once or plural times and then the shooting operation using other exposure time is performed once or plural times, whereby moving image data for reproducing a smooth moving image can be recorded and displayed, and the face detecting process and accuracy in calculation of AF evaluation value are enhanced.

(02) In the above embodiments, the shooting operations are performed using two different exposure times, but plural exposure times (more than two exposure times) may be used for the shooting operations.

(03) In the above embodiments, different exposure times are used for shooting operations but in place of the exposure times, different exposure conditions may be used for shooting operations. In short, a first exposure time appropriate for shooting a moving image and a second exposure condition appropriate for shooting a still image may be alternately used for shooting operations.

(04) In the first and second embodiments, the frame image data "B" shot using the exposure time "B" is displayed in real time, but the frame image data "A" shot using the exposure time "A" may be displayed in real time. Further, a modification may be made to the first and second embodiments, the user may be able to choose one of the frame image data "A" and the frame image data "B" for displaying in real time.

(05) In the first and second embodiments, when the shutter button is pressed, the frame image data "A" shot just before the shutter button is pressed is recorded as a still image, but frame image data "A" shot just after the shutter button is pressed may be recorded as a still image.

(06) In the first and second embodiments, only the frame image data "A" shot just before the shutter button is pressed is recorded as a still Image, but plural pieces of frame image data "A" shot during a certain period of a time to just after the shutter button is pressed, or certain pieces of frame image data "A" shot after the shutter button is pressed may be recorded. Further, the plural, pieces of frame image data "A" shot during a certain period of a time just after the shutter button is pressed, or certain pieces of frame image data "A" shut after the shutter button is pressed may be composed image data, and plural pieces of composed image data may be successively recorded, whereby continuity is maintained in the moving image and deterioration in image quality is suppressed in the moving image. Further, still image data continuously shot may be recorded, thereby reducing the possibility of losing shutter chances.

Plural pieces of frame image data "A" shot during a period beginning from a time back a certain time from the time when the shutter button is pressed or plural pieces of composed image data successively produced using said plural pieces of frame image data "A" may be recorded as still images.

Plural pieces of frame image data "A" shot during a period before or after frame image data "A" was shot just before the shutter button was pressed or plural pieces of composed image data successively produced using said plural pieces of frame image data "A" may be recorded as still images. In this case, it is necessary to store the shot frame image data in the buffer memory for a certain period, because sometime it is necessary to store frame image data shot in the past.

As described, the frame image data "A" shot in the past (the frame image data "A" shot before the shutter button is pressed) can be recorded as a still image(s), whereby the possibility of losing shutter chances is reduced.

(07) In the second embodiment, the shutter button cannot be pressed during the image composing/recording process (see step S25 in FIG. 5). But a modification may be made such that the shutter button can be pressed even if during the image composing/recording process. In this case, when the image composing/recording process is finished, during which the shutter button was pressed, a following image composing/recording process starts using frame image data "A" shot just before or just after the shutter button is pressed. In short, even while the image composing/recording process is being performed, the following image composing/recording process is scheduled to be performed. In this case, the process at S25 is omitted and CPU 10 advances directly to step S26 from step S24.

(08) In the second and third embodiments, the frame image data "A" and the frame image data "B" shot, just before said frame image data "A" are composed. Point is that the frame image data "A" and the frame image data "B" corresponding to said frame image data "A" are composed.

The frame image data corresponding to the frame image data "A" is frame image data shoe using a different exposure time from the frame image data "A" just before or just after the frame image data displayed most recently.

(09) In the third embodiment, when the pause manipulation is performed in the moving image playing process, or when the playing resume manipulation is performed in the pause state, the frame image data "A" and the frame image data "B" are switched to be displayed depending on the frame number "n", but the frame image data displayed most recently is switched to the appropriate frame image data shot using another exposure time to be displayed thereafter. The appropriate frame image data is the frame image data which is shot using a different exposure time just before or just after the frame image data displayed most recently was obtained.

For example, a case will be described, in which frame image data shot using a different exposure time just after frame image data currently displayed is used as corresponding or appropriate frame image data. When the frame image date "B9" is displayed at the time when the pause manipulation is performed in the moving image playing process, the frame image data "A10" is used as the corresponding frame image data.

Further, another case will be described, in which frame image data shot using a different exposure time just before frame image data currently displayed is used as the corresponding frame image data. When the frame image data "B9" is displayed most recently at the time when the pause manipulation is performed in the moving image playing process, the frame image data "A8" is used as the corresponding frame image data. Further, when the frame image data "A8" is displayed most recently at the time when the moving image playing operation is resumed, the frame image data "B7" is used as the corresponding frame image data.

(10) In the third embodiment, moving image data "A" shot using the exposure time "A" and moving image data "B" shot using the exposure time "B" are recorded as a single moving image file, but point is that the moving image data "A" shot using the exposure time "A" and the moving image data "B" shot using the exposure time "B are associated with each other and recorded. There is no need to record the both data as a single moving image file.

(11) In the third embodiment, when the shutter button is pressed at step S61 in FIG. 8, the composed image data is produced and recorded using the frame image data "A" expanded most recently (frame image data "A" currently displayed in the pause state), that is, using the frame image data "A" having the currently set frame number "n", but when the shutter button is pressed at step) S61 in FIG. 8, the frame image data "A" expanded most recently (frame image data "A" currently displayed in the pause state) may be recorded as a still image, whereby deterioration in image quality of the still image is suppressed.

(12) In the third embodiment, the shutter button cannot be pressed during the image composing/recording process, and/or the playing resume manipulation cannot, be performed during the image composing/recording process (YES at step S60 in FIG. 8), but a modification may be made to the third embodiment such that the shutter button can be pressed during the image composing/recording process, and/or the playing resume manipulation can be performed during the image composing/recording process.

When the shutter button is pressed while the image composing/recording process is being performed, and said composing/recording process is finished, the image composing/recording process is started using the frame image data "A" which is shot just before or just after the shutter button is presses. In short, even while the image composing/recording process is being performed, the following composing/recording process is scheduled to be performed next. In this case, the process at S60 is not necessary, and when it is determined at step S54 in FIG. 7 that the playing operation is not being performed, CPU 10 advances directly to step S61 in FIG. 8.

(13) In the third embodiment, when the shutter button is pressed in the pause state, a still image is recorded, but a modification may be made to the third embodiment such that even when the shutter button is pressed not in the pause state, but during the moving image playing operation, a still image is recorded.

In this case, a further modification may be made such that frame image data "A" is recorded, which corresponds to frame image data "B" displayed at a time when the shutter button is pressed. Another modification may be made such that frame image data "B" displayed at a time when the shutter button is pressed and frame image data "A" corresponding to said frame image data "B" are composed and recorded.

(14) The above modifications (01) and (13) may be arbitrarily combined to the extent yielding no conflict.

(15) The embodiments of the invention and the modifications to these embodiments are described only to illustrate preferred embodiments of the inventions, for better understanding of the principle and structure of the invention, but by no means restrict the scope of the inventions defined in the accompanying claims.

Therefore, it should be understood that various sorts of alternations and modifications to be made to the above embodiments of the invention will fall within the scope of the invention and are protected under the accompanying claims.

In the above embodiments, the image pick-up apparatus of the invention which is used in the digital camera is described, but the invention is not restricted to the invention used in the digital camera, and the invention may be used for any apparatus which is capable of shooting or playing an image.

What is claimed is:

1. An imaging apparatus comprising:
    an imaging section which images a subject;
    a first imaging control section which causes the imaging section to repeatedly perform imaging with a first exposure time;
    a second imaging control section which causes the imaging section to repeatedly perform imaging with a second exposure time that is shorter than the first exposure time such that the imagings repeatedly performed with the first exposure time by the first imaging control section are repeatedly interrupted by the imagings with the second exposure time;
    a moving image obtaining section which obtains image data taken by the first imaging control section as moving image data; and
    a static image obtaining section which synthesizes image data taken by the second imaging control section and image data corresponding to the image data and taken by the first imaging control section to produce one item of image data, and obtains the produced image data as static image data.

2. The imaging apparatus according to claim 1, wherein the second imaging control section causes the imaging section to perform imaging with the second exposure time at a predetermined cycle interval.

3. The imaging apparatus according to claim 1, further comprising a moving image recording control section which causes a recording section to record the moving image data obtained by the moving image obtaining section.

4. The imaging apparatus according to claim 1, further comprising a display control section which causes a display section to display the moving image data obtained by the moving image obtaining section.

5. The imaging apparatus according to claim 1, further comprising a static image recording control section which causes a recording section to record the static image data obtained by the static image obtaining section.

6. The imaging apparatus according to claim 1, further comprising an instruction section which gives an instruction to obtain static image data;
    wherein the static image obtaining section obtains one or a plurality of items of image data as static image data in accordance with an instruction from the instruction section.

7. The imaging apparatus according to claim 6, wherein in accordance with an instruction from the instruction section, the static image obtaining section obtains, as static image data, data taken not earlier than a timing of the instruction by a predetermined period of time.

8. The imaging apparatus according to claim 1, wherein the image data taken by the first imaging control section corresponding to the image data taken by the second imaging control section is the image data taken by the first imaging control section immediately before or immediately after the image data taken by the second imaging control section.

9. The imaging apparatus according to claim 1, further comprising a recording control section which records, on a recording section, moving image data obtained by the moving image obtaining section and static image data obtained by the static image obtaining section in association with each other;
    wherein the static image obtaining section obtains, as static image data, a plurality of items of image data obtained through repeated imagings by the second imaging control section.

10. The imaging apparatus according to claim 9, further comprising a designation section which designates an arbitrary moving image frame among the items of moving image data recorded on the recording section;
    wherein the static image obtaining section obtains static image data corresponding to the arbitrary moving image frame designated by the designation section and recorded on the recording section in association; and
    wherein the recording control section further records, on the recording section, the static image data obtained by the static image obtaining section corresponding to the arbitrary moving image frame.

11. A moving image reproducing apparatus which reproduces moving image data repeatedly taken with a first exposure time which were recorded in association with a plurality of items of static image data obtained through repeated imagings with a second exposure time that is shorter than the first exposure time such that the imagings repeatedly performed with the second exposure time are repeatedly interrupted with the imagings with the first exposure time, the apparatus comprising:
    a designation section which designates an arbitrary moving image frame among the moving image data;
    a static image obtaining section which synthesizes the moving image frame designated by the designation section and static image data corresponding to the moving image frame to produce one item of image data, and obtains the produced image data as static image data; and
    a recording control section which records the static image data obtained by the static image obtaining section on a recording section.

12. A non-transitory computer-readable storage medium having a program stored thereon which is executable by a computer equipped with an imaging section to control the computer to function as elements including:
    a first imaging control section which causes the imaging section to repeatedly perform imaging with a first exposure time;
    a second imaging control section which causes the imaging section to repeatedly perform imaging with a second exposure time that is shorter than the first exposure time such that the imagings repeatedly performed with the first exposure time by the first imaging control section are repeatedly interrupted by the imagings with the second exposure time;
    a moving image obtaining section which obtains image data taken by the first imaging control section as moving image data; and
    a static image obtaining section which synthesizes image data taken by the second imaging control section and image data corresponding to the image data and taken by the first imaging control section to produce one item of image data, and obtains the produced image data as static image data.

13. A non-transitory computer-readable storage medium having a program stored thereon which controls a computer of a moving image reproducing apparatus, which reproduce moving image data repeatedly taken with a first exposure time which were recorded in association with a plurality of items of static image data obtained through repeated imagings with a second exposure time that is shorter than the first exposure time such that the imagings repeatedly performed with the first exposure time are repeatedly interrupted by the imagings with the second exposure time, the program being executable to control the computer to function as elements including:

a designation section which designates an arbitrary moving image frame among the moving image data;

a static image obtaining section which synthesizes the moving image frame designated by the designation section and static image data corresponding to the moving image frame to produce one item of image data, and obtains the produced image data as static image data; and a recording control section which records the static image data obtained by the static image obtaining section on a recording medium.

* * * * *